(12) United States Patent
Combs et al.

(10) Patent No.: US 12,229,034 B2
(45) Date of Patent: Feb. 18, 2025

(54) DEVICE, SYSTEM AND METHOD FOR IDENTIFYING A SOURCE OF LATENCY IN PIPELINE CIRCUITRY

(71) Applicant: Intel Corporation, Santa Clara, CA (US)

(72) Inventors: Jonathan Combs, Austin, TX (US); Jason Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/748,382

(22) Filed: Jan. 21, 2020

(65) Prior Publication Data

US 2020/0233772 A1     Jul. 23, 2020

Related U.S. Application Data

(63) Continuation of application No. 15/859,016, filed on Dec. 29, 2017, now Pat. No. 10,579,492.

(51) Int. Cl.
*G06F 3/00* (2006.01)
*G06F 9/54* (2006.01)
(Continued)

(52) U.S. Cl.
CPC .......... *G06F 11/3419* (2013.01); *G06F 9/542* (2013.01); *G06F 11/3024* (2013.01); *G06F 11/3409* (2013.01)

(58) Field of Classification Search
CPC .............................. G06F 9/542; G06F 11/3419
(Continued)

(56) References Cited

U.S. PATENT DOCUMENTS 5,809,450 A * 9/1998 Chrysos .................. G06F 8/445
712/237
5,854,918 A 12/1998 Baxter
(Continued)

FOREIGN PATENT DOCUMENTS

WO    WO-0070469 A2 * 11/2000 ........... G06F 9/3824

OTHER PUBLICATIONS

Chuanxiong Guo, Pingmesh: A Large-Scale System for Data Center Network Latency Measurement and Analysis. (Year: 2015).*
(Continued)

*Primary Examiner* — Lechi Truong
(74) *Attorney, Agent, or Firm* — NICHOLSON DE VOS WEBSTER & ELLIOTT LLP

(57) ABSTRACT

Techniques and mechanisms for determining a latency event to be represented in performance monitoring information. In an embodiment, circuit blocks of a pipeline experience respective latency events at variously times during tasks by the pipeline which service a workload. The circuit blocks send to an evaluation circuit of the pipeline respective event signals which each indicate whether a respective latency event has been detected. The event signals are communicated in parallel with at least a portion of the pipeline. In response to a trigger event in the pipeline, the evaluation circuit selects an event signal, based on relative priorities of the event signals, which provides a sample indicating a detected latency event. Based on the selected event signal, a representation of the indicated latency event in provided to latency event count or other value performance monitoring information. In another embodiment, different time delays are applied to various event signals.

14 Claims, 14 Drawing Sheets

(51) Int. Cl.
   *G06F 11/30* (2006.01)
   *G06F 11/34* (2006.01)
(58) Field of Classification Search
   USPC .......................................................... 719/318
   See application file for complete search history.

(56) References Cited

U.S. PATENT DOCUMENTS

| | | | | |
|---|---|---|---|---|
| 6,052,802 | A * | 4/2000 | Zahir | G06F 11/3466 |
| | | | | 714/E11.2 |
| 6,070,009 | A * | 5/2000 | Dean | G06F 11/3466 |
| | | | | 717/130 |
| 6,092,180 | A * | 7/2000 | Anderson | G06F 9/3836 |
| | | | | 712/216 |
| 6,148,396 | A * | 11/2000 | Chrysos | G06F 11/3476 |
| | | | | 712/216 |
| 6,157,988 | A * | 12/2000 | Dowling | G06F 12/0875 |
| | | | | 711/140 |
| 6,175,814 | B1 * | 1/2001 | Chrysos | G06F 11/3452 |
| | | | | 714/39 |
| 6,192,466 | B1 * | 2/2001 | Gschwind | G06F 9/3865 |
| | | | | 712/214 |
| 6,237,073 | B1 * | 5/2001 | Dean | G06F 12/10 |
| | | | | 714/E11.2 |
| 6,237,081 | B1 * | 5/2001 | Le | G06F 9/3858 |
| | | | | 712/205 |
| 6,829,663 | B1 * | 12/2004 | Ghaffari | G06F 13/385 |
| | | | | 710/65 |
| 7,343,474 | B1 * | 3/2008 | Jordan | G06F 9/3851 |
| | | | | 712/214 |
| 8,891,392 | B2 * | 11/2014 | Cook | H04L 43/0852 |
| | | | | 370/252 |
| 2008/0028183 | A1 * | 1/2008 | Hwu | G06F 9/3832 |
| | | | | 712/20 |
| 2008/0071939 | A1 * | 3/2008 | Tanaka | G06F 11/3419 |
| | | | | 710/18 |
| 2010/0036987 | A1 * | 2/2010 | Streett | G06F 9/3865 |
| | | | | 712/E9.016 |
| 2011/0016295 | A1 * | 1/2011 | Catherwood | G06F 13/24 |
| | | | | 712/244 |
| 2011/0085431 | A1 * | 4/2011 | Nishiyama | G11B 7/0906 |
| 2012/0023314 | A1 | 1/2012 | Crum et al. | |
| 2013/0166952 | A1 | 6/2013 | Schon et al. | |
| 2014/0258688 | A1 * | 9/2014 | Breternitz | G06F 11/3466 |
| | | | | 712/220 |
| 2015/0074677 | A1 * | 3/2015 | Pream | G06F 9/5016 |
| | | | | 718/104 |
| 2016/0378470 | A1 * | 12/2016 | Yasin | G06F 9/3836 |
| | | | | 712/226 |
| 2017/0212760 | A1 * | 7/2017 | Bhaskaran | G06F 9/3802 |
| 2018/0300268 | A1 | 10/2018 | Yang et al. | |

OTHER PUBLICATIONS

Bryan Black, Load Execution Latency Reduction. (Year: 1998).*
Mohammad Alizadeh, Less is More: Trading a little Bandwidth for Ultra-Low Latency in the Data Center. (Year: 1996).*
Can Tang, An Improved Algorithm for Tor Circuit Scheduling. (Year: 2010).*
Dongkook Park, Design of a Dynamic Priority-Based Fast Path Architecture for On-Chip Interconnects. (Year: 2007).*
Hemendra Singh Negi, Accurate Estimation of Cache-Related Preemption Delay. (Year: 2003).*
Chun C. Lee, A SAR-Assisted Two-Stage Pipeline ADC. (Year: 2011).*
Ronald D. Barnes, Tolerating Cache-Misslatency With Multipasspipelines. (Year: 2006).*
Final Office Action, U.S. Appl. No. 15/859,016, Aug. 6, 2019, 16 pages.
Jia et al., "MRPB: Memory Request Prioritization for Massively Parallel Processors", 2014, 12 pages.
Non-Final Office Action, U.S. Appl. No. 15/859,016, Mar. 7, 2019, 13 pages.
Notice of Allowance, U.S. Appl. No. 15/859,016, Nov. 4, 2019, 9 pages.

* cited by examiner

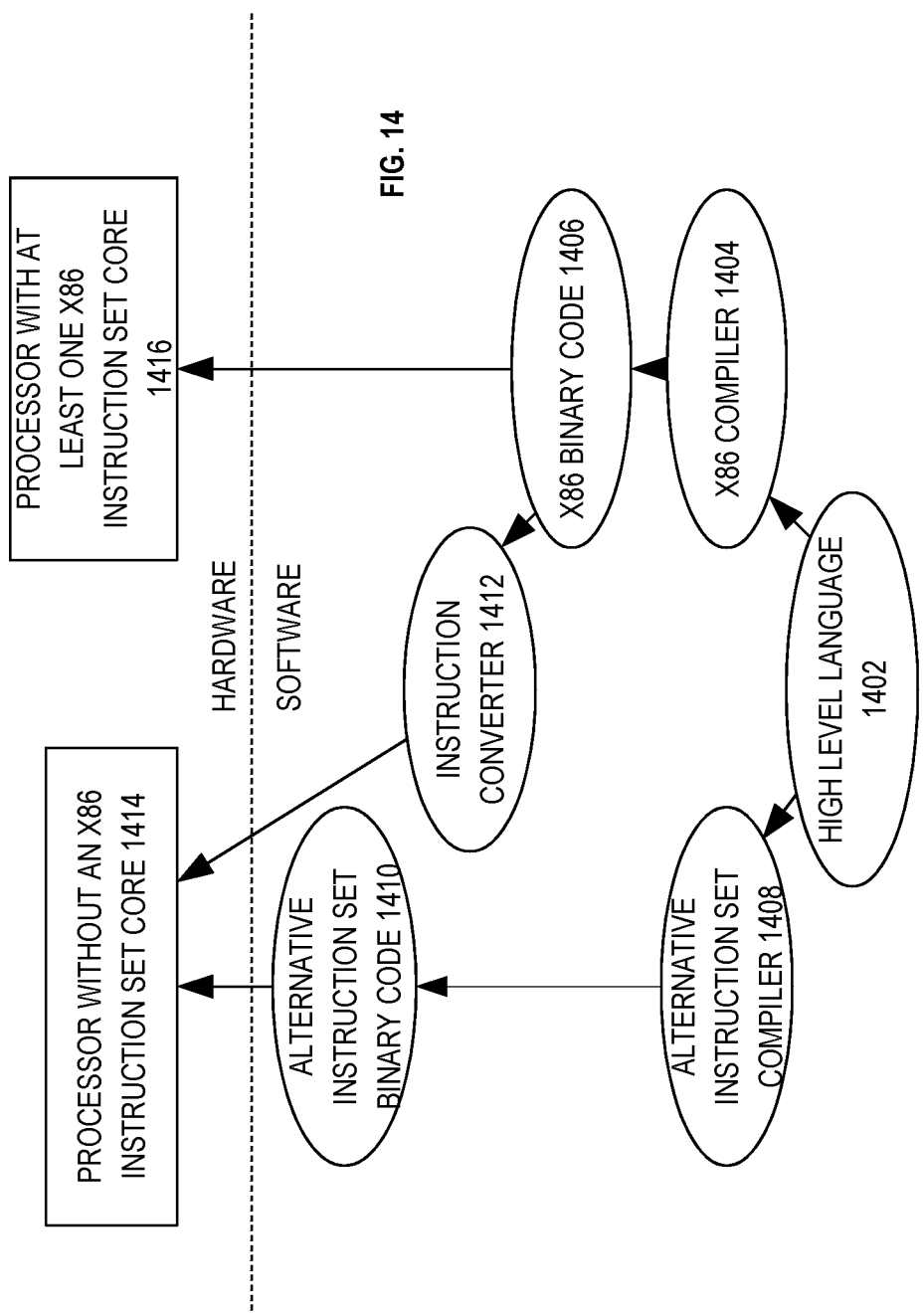

DEVICE, SYSTEM AND METHOD FOR IDENTIFYING A SOURCE OF LATENCY IN PIPELINE CIRCUITRY

CLAIM OF PRIORITY

This application is a continuation of, and claims priority to, U.S. patent application Ser. No. 15/859,016, filed on Dec. 29, 2017 and titled "DEVICE, SYSTEM AND METHOD FOR IDENTIFYING A SOURCE OF LATENCY IN PIPELINE CIRCUITRY", which is incorporated by reference in its entirety.

BACKGROUND

1. Technical Field

Embodiments of the invention generally relate to the monitoring of events at a pipeline and more particularly, but not exclusively, to a processor pipeline to prioritize latency events for tracking.

2. Background Art

Operations by a pipeline of a processor are subject to latencies due to instruction cache misses, translation lookaside buffer (TLB) misses and various other such events. A goal of performance monitoring is to determine a count of a latency events of a given event type, where the count is subsequently used in analysis by a performance monitoring tool.

In the case of some processor core architectures, a front-end bound event is one wherein a front-end pipeline of the processor is not ready to provide data to a back-end pipeline of the processor. Today, tracking of front-end bound events is implemented with specialized hardware which tags data with an extra bit based on a latency event of the given event type. The bit is then communicated down the front-end pipeline, along with the data, to indicate a latency event of a latency event type which is currently being counted. The bit typically results in the incrementing of a count value at a counter, where a subsequent overflow of the counter triggers a performance monitoring interrupt.

One limitation of such event counting techniques is that, for a count of events of a given event type, the count will be incremented, in response to one such event, regardless of whether or not that particular event actually ends up delaying some overall operation of the pipeline. As a result, the count of events will mask those events, if any, which actually impacted performance at some downstream point along the pipeline. This tends to complicate the detection, diagnosis and remediation of front-end operational issues.

Moreover, these event counting techniques tend to be constrained to event counting for only one type of latency event at any given time. This constraint poses problems for machine virtualization, the concurrent use of multiple performance monitoring tools and various other situations. As successive generations of processors continue to scale in size and speed, there is expected to be an increasing demand placed on incremental improvements to the support of performance monitoring.

BRIEF DESCRIPTION OF THE DRAWINGS

The various embodiments of the present invention are illustrated by way of example, and not by way of limitation, in the figures of the accompanying drawings and in which:

FIG. 14 is a block diagram contrasting the use of a software instruction converter to convert binary instructions in a source instruction set to binary instructions in a target instruction set according to an embodiment.

DETAILED DESCRIPTION

Embodiments discussed herein variously provide techniques and mechanisms for selecting a latency event to be accounted for in performance monitoring, wherein the identifying is based on relative priorities of various types of latency events. As used herein with respect to a pipeline, "circuit block" (or "CB") refers to circuitry of the pipeline, the circuitry operable to perform at least one task of workload which the pipeline is to service. Such circuitry may be coupled to communicate with one or more other circuit blocks of the pipeline. A pipeline may comprise circuit blocks each to perform a different respective task—e.g., where some or all such circuit blocks are arranged in an in-series configuration.

In an embodiment, pipeline circuitry includes circuit blocks which are each to detect for a respective latency event and to generate a respective signal indicating a detected instance of the latency event. Such signals may be variously communicated, in parallel with at least a portion of the pipeline circuitry, to an evaluation circuit which selects one such signal for representation in an event count or other performance monitoring data.

Certain features of various embodiments are described herein with reference to the evaluation of signaling which variously indicates latency events in a front-end pipeline of a processor. However, such description may be extended to additionally or alternatively apply to the evaluation of signaling which indicates latency events in any of a variety of other circuits having a pipeline architecture.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a pipeline comprising an in-series arrangement of at least some circuit blocks.

Figure 1:
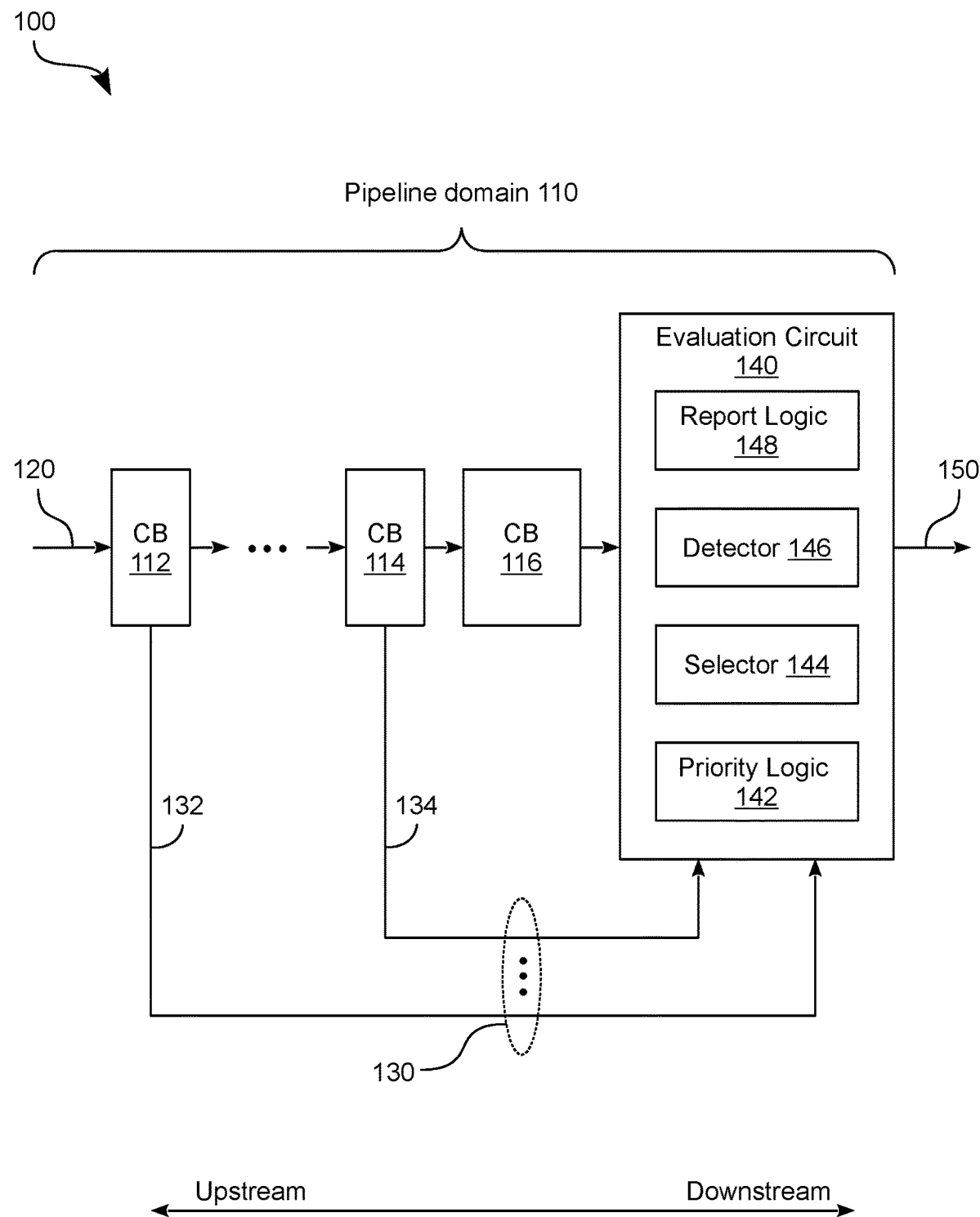
FIG. 1 is a functional block diagram illustrating elements of a circuit device to communicate latency information according to an embodiment.

FIG. 1 shows features of a circuit device 100 to facilitate monitoring of latency events in a pipeline according to an embodiment. Some or all of circuit device 100 may reside on a single integrated circuit (IC) chip—e.g., wherein circuit device 100 is or otherwise includes a processor comprising one or more processor cores. Circuit device 100 is one example of an embodiment wherein signals, which variously indicate latency events in a pipeline, are communicated, in parallel with at least a portion of the pipeline, and are selectively included in (or excluded from) performance monitoring information.

As shown in FIG. 1, circuit device 100 may include a pipeline configured to service an instruction or other such processing workload, wherein a domain of the pipeline (e.g., the illustrative in-order pipeline domain 110 shown) comprises multiple circuit blocks. With respect to a given pipeline, "domain" refers herein to at least some contiguous subset of that pipeline. Some or all of a domain may be in-order, where "in-order" refers to the characteristic of a domain servicing different workloads according to an order in which the workloads were successively provided to the domain. For example, in the case where a first CB in domain 110 is servicing a first workload (e.g., a particular instruction) and a second CB in domain 110 is servicing a second workload—and where the first CB is downstream of the second CB—domain 110 began servicing the first workload prior to servicing the second workload.

In the example embodiment shown, domain 110 comprises circuit blocks (CBs) 112, . . . , 114 which are each to perform a respective task based on an input 120 which, for example, includes an instruction or other workload to be serviced with the pipeline. CBs 112, . . . , 114 may variously provide functionality to perform any of a variety of tasks to service such a workload. For example, one or more of CBs 112, . . . , 114 may provide functionality which is adapted from conventional processor techniques. By way of illustration and not limitation, one or more of CBs 112, . . . , 114 may provide instruction fetch functionality such as that of an instruction pointer (IP) multiplexer (MUX), a branch predictor, an instruction translation lookaside buffer (ITLB), an instruction cache tag, an IP queue, an instruction cache or the like. Alternatively or in addition, one or more of CBs 112, . . . , 114 may provide instruction decode functionality such as that of an instruction byte buffer or an instruction decoder. In some embodiments, one or more of CBs 112, . . . , 114 provide a microcode sequencer and/or other such functionality of a processor. However, some embodiments are not limited to a particular type of one or more tasks that may be performed with CBs 112, . . . , 114.

Some or all of CBs 112, . . . , 114 may further operate to each detect for a respective event (referred to herein as a latency event) which results from an attempt to perform an associated task. As used herein, "latency event" refers to an event which has resulted in, or is expected to result in, an at least temporary delay of an availability of some circuit functionality and/or some communication between two circuit blocks. For example, a latency event may include a failure of task circuitry to perform an operation, or may include a delay (actual or expected) to a successful completion of an operation by the task circuitry. Alternatively or in addition, a latency event may include a completion of an operation which, although successful, has resulted in, or is to result in, an unavailability of a functionality of the task circuitry for at least some period of time. A latency event may contribute to a timing "bubble," the completion of which some downstream CB of the pipeline may have to await before some further servicing of a workload can take place.

A circuit block of a pipeline according to some embodiments communicates a signal (referred to herein as an "event signal") which indicates detection of—or alternatively, a failure to detect—a respective latency event at that circuit block. An event signal may be said to be "asserted" at a time when the event signal is communicating an indication of a latency event—e.g., wherein the event signal is "deasserted" or "unasserted" when it indicates an absence of any such latency event. For example, an event signal may merely communicate a binary value which variously indicates detection or non-detection of a latency event. In other embodiments, an event signal may communicate an event type identifier and/or other information which describes the latency event. Operations related to a given event signal may include operations on corresponding information (referred to herein as "event information") which is communicated by that given event signal. For example, to the extent that a given event signal may be generated, communicated, delayed, prioritized, sampled, selected, etc., corresponding event information (which is represented with that given event signal) may be thus generated, communicated, delayed, prioritized, sampled, selected, etc. Accordingly, event information (e.g., at least a sample thereof) may indicate detection of a particular latency event at a circuit block. Alternatively such event information may instead indicate one or either of a detected absence of the latency event or a failure to detect the latency event.

In the example embodiment shown, device 100 further comprises signal lines 130 which are each coupled to communicate a respective event signal from a corresponding one of CBs 112, . . . , 114. For example, event signals 130 may include a signal line 132 to communicate an event signal from CB 112, and a signal line 134 to communicate an event signal from CB 114. Signal lines 130 may be variously communicated each in parallel with at least some portion of the pipeline which is arranged in an in-series configuration of circuit blocks.

Some embodiments provide improved performance monitoring at least in some instances where, with respect to overall performance of some pipelines, a timing bubble at one location in a pipeline may be mooted by another timing bubble at a downstream location in that pipeline. Alternatively or in addition, a timing bubble may be mooted by some downstream circuit block having sufficient data to operate on during the duration of that timing bubble. To exploit the possibility of a timing bubble being mooted, some embodiments communicate at least some event signals in parallel with at least a portion of a pipeline—e.g., instead of having a circuit block tag a result of a task with latency event information, once the task result is available, for communication downstream within the pipeline. A latency event may thus be indicated to some downstream evaluation logic while the latency event is still pending.

For example, signal lines 130 may each communicate a respective event signal to an evaluation circuit 140 of the pipeline. Evaluation circuit 140 may reside in domain 110—e.g., wherein evaluation circuit 140 is upstream of any reorder buffer of the pipeline. In an embodiment, evaluation circuit 140 operates to selectively determine, based on event signals communicated via signal lines 130, whether a given latency event is to be represented with some performance monitoring information. Such selective determining may include selecting one event signal based on a prioritization of that event signal over one or more other event signals. In some embodiments, selection of an event signal (and thus, selection of a latency event represented thereby) may be performed in response to an indication that a particular circuit block has not been provided with information which is necessary to perform a particular task.

In the example embodiment shown, evaluation circuit 140 is downstream of a circuit block CB 116 of the pipeline—e.g., wherein CB 116 is downstream of CBs 112, . . . , 114. CB 116 may include any of a variety of functional units—e.g., including a micro-operation queue, a register allocation unit, a register renaming unit and/or the like—which is coupled to receive and operate on information from upstream circuitry such as that of CB 114. Evaluation circuit 140 may detect—e.g., based on an output from CB 116 (or an absence thereof)—that an unavailability of information to CB 116 has resulted in, or will result in, a trigger condition for the communication of performance monitoring information. Such a trigger condition may include a wasted opportunity to use a next available resource item (referred to herein as a "slot") in a sequence of such resources. By way of illustration and not limitation, a slot may include a time slot which is available for a circuit block to service any next available sub-instruction (e.g., a micro-operation) in a sequence of sub-instructions. Alternatively or in addition, a slot may include a next available entry in a reorder buffer (or other such data structure) to store or otherwise prepare a sub-instruction for servicing.

In response to some circuit block (such as CB 116) being unable to receive data from some upstream source, evaluation circuit 140 may detect for any latency events that might be indicated each by a sample of a respective event signal. Based on such detecting, evaluation circuit 140 may selectively provide a representation of a particular latency event for use in determining an event count value and/or other such performance monitoring information.

By way of illustration and not limitation, evaluation circuit 140 may include detector 146 comprising circuitry to detect an unavailability of information at one or more reference points of the pipeline—e.g., wherein detector 146 is coupled to detect a failure of CB 114 to provide a micro-operation to a micro-operation queue of CB 116. In response to detection of such a failure, a selector 144 of evaluation circuit 140 may perform a selection from among event signals variously communicated via signal lines 130. Based on the selection, evaluation circuit 140 may signal that a latency event indicated by the selected event signal is to be represented in performance monitoring information. For example, report logic 148 of evaluation circuit 140 may generate a signal which, directly or indirectly, is to increment a counter of latency events. In some embodiments, report logic 148 tags or otherwise marks a micro-operation, or other such sub-instruction, with one or more identifiers each to describe or otherwise indicate a respective latency event. One or more latency events may be indicated, for example, with a tag which is encoded according to a one-hot encoding scheme. An indication of a selected latency event may be communicated in a signal output 150 from evaluation circuit 140. Signal output 150 may be communicated downstream in the pipeline or, alternatively, along another signal path (other than any path of the pipeline) to counter circuitry and/or other logic which is to store or otherwise maintain performance monitoring information.

The selection of an event signal by selector 144 may be based on whether, for each of one or more event signals, a respective sample of that event signal indicates an occurrence of a respective latency event. Alternatively or in addition, such selection may be based on a relative prioritization of event signals with respect to each other. For example, evaluation circuit 140 may include or couple to circuitry (such as the illustrative priority logic 142 shown) which determines respective priorities of event signals and, accordingly, respective priorities of latency events variously indicated by such event signals. The priority of a given event signal, relative to another event signal, may be associated with a path via which the given event signal was received. Alternatively, an event signal's priority may be indicated by a timing of a communication of the event signal, a priority identifier (or other such information) which is included in the event signal itself, and/or some system state (e.g., including reference information or a circuit configuration) which is included in or otherwise available to evaluation circuit 140. Some embodiments are not limited to a particular mechanism by which event signals (and corresponding latency events) are variously given different priorities relative to each other. For example, in some embodiments, priority logic 142 is instead distributed across multiple ones of CBs 112, . . . , 114 and evaluation circuit 140.

Responsive to detection of a trigger event by detector 146, selector 144 may select an event signal to determine a latency event to be indicated in signal output 150. A given event signal may be precluded from selection by selector 144 where a sample of that given event signal—e.g., the sample taken in response to the trigger event—does not indicate any instance of a latency event. Moreover, a given event signal may be precluded from selection by selector 144 where a sample of some other event signal (the sample taken in response to the trigger event) does indicate a latency event, wherein that other event signal has a higher priority than the given event signal. Accordingly, selector 144 may select an event signal which is a highest priority event signal of those event signals, the respective samples of which each indicate a respective latency event.

Although some embodiments are not limited in this regard, selector 144 may sequentially evaluate respective samples of event signals, in order from a highest priority event signal to a lowest priority event signal, until a latency event is indicated by one such sample. Based on the detection of such a latency event, selector 144 may forego the further evaluation of any samples of lower priority event signals (e.g., at least until the detection by detector 144 of some next trigger event).

Figure 2:
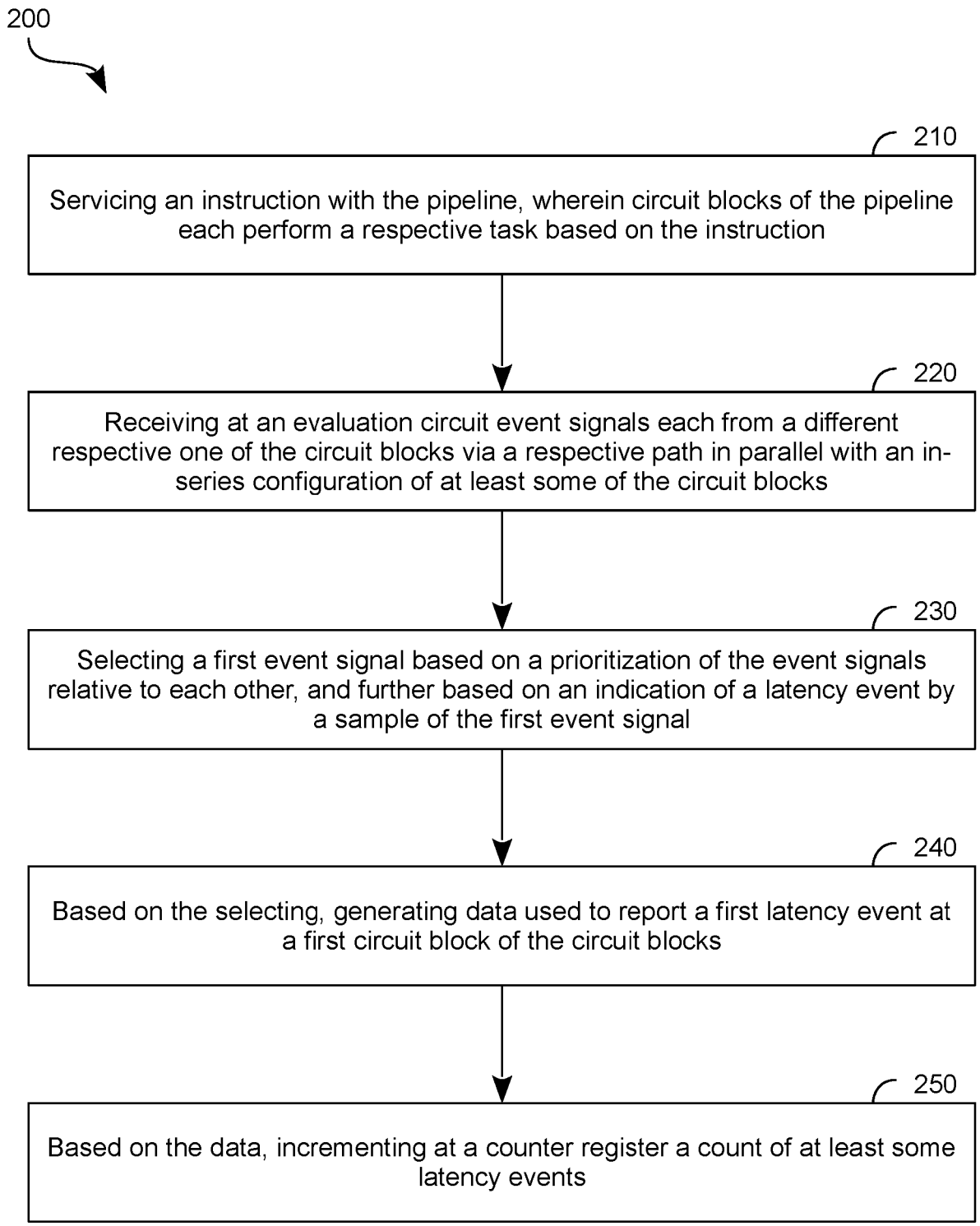
FIG. 2 is a flow diagram illustrating elements of a method to communicate latency event information with pipeline circuitry according to an embodiment.

FIG. 2 shows features of a method 200 to provide information indicating latency in a pipeline according to an embodiment. Method 200 is one example of an embodiment wherein a selection from among prioritized event signals is used to determine whether a given latency event is to be represented in performance monitoring information such as a count of latency events of a particular event type. Some or all operations of method 200 may be performed with a pipeline such as that of circuit device 100, for example.

As shown in FIG. 2, method 200 may include (at 210) servicing an instruction with the pipeline, wherein circuit blocks of the pipeline each perform a respective task based on the instruction. The pipeline may be a front-end pipeline of a processor, for example. Alternatively or in addition, the instruction may include or otherwise correspond to multiple sub-instructions (e.g., multiple micro-operations), the execution of which implements at least in part a servicing of the instruction.

In an embodiment, method 200 further comprises (at 220) receiving, at an evaluation circuit of the pipeline, event signals each from a different respective one of the circuit blocks via a respective path in parallel with an in-series configuration of at least some of the circuit blocks. The event signals may to indicate whether a respective latency event is detected by a circuit block from which that event signal was communicated. For example, the receiving at 220 may include evaluation circuit 140 receiving event signals via signal lines 130. The event signals may each correspond to a different respective circuit block—e.g., wherein at least some of the circuit blocks are each coupled to indicate, with the corresponding event signal, detection of a respective latency event. In some embodiments, method 200 further comprises applying one or more delays each to a respective one of the event signals—e.g., wherein at least some event signals have different respective time delays variously applied thereto.

Method 200 may further comprise (at 230) selecting, with the evaluation circuit, a first event signal of the event signals based on a prioritization of the event signals relative to each other, and further based on an indication of a latency event by a sample of the first event signal. For example, the selecting at 230 may be based on a determination that, for any event signal of the event signals which is a higher priority signal than the first event signal, a sample of that event signal fails to indicate a latency event. The prioritization of event signals may include an association of the first event signal with a first priority level which is higher than a second priority level that is associated with a second event signal. Such prioritization of event signals may be based on the relative positions of the corresponding circuit blocks in the pipeline. For example, the evaluation circuit may be downstream of both a first circuit block and a second circuit block, wherein, with respect to a sequential order of the circuit blocks along the pipeline, the evaluation circuit is closer to the first circuit block than it is to the second circuit block. In such an embodiment, an event signal from the first circuit block (e.g., CB 114) may be given higher priority than an event signal from the second circuit block (e.g., CB 112). This prioritization may reflect the fact that a latency event at the second circuit block could, in at least some scenarios, be mooted by another latency event at the first circuit block (or be mooted by the first circuit block having sufficient data to operate during the latency event at the second circuit block).

In an embodiment, method 200 further comprises (at 240) generating, with the evaluation circuit, data based on the selected first event signal, the data used to report a first latency event at a first circuit block of the circuit blocks. For example, method 200 may further comprise detecting at the evaluation circuit a failure to communicate information in the pipeline (e.g., detecting that CB 114 is starved of input data), wherein the data is generated at 240—and in some embodiments, the selecting is performed at 230—in response to such a failure. The data generated at 240 may be included (for example, as a tag or other marker data) in a communication of a sub-instruction from the evaluation circuit—e.g., based on a determination that the sub-instruction is a next sub-instruction after the detected failure to communicate information in the pipeline. In some embodiments, the data generated at 240 is first data to report only the first latency event—e.g., wherein method 200 further generates, based on the event signals, second data to report a second latency event at the multiple circuit blocks. In such an embodiment, the second data may also be included in the communication of the first sub-instruction to indicate—to a reorder buffer, one or more counters and/or other circuitry—a concurrency of two or more latency events in the pipeline.

Although some embodiments are not limited in this regard, method 200 may further comprise operations which update or otherwise determine performance monitoring information based on the data generated at 240. By way of illustration and not limitation, method 200 may further comprise (at 250), based on the data generated at 240, incrementing at a counter register a count of at least some latency events which occur at the circuit blocks.

For example, the data generated at 240 may include, or provide a basis for, a count of latency events which are each a respective one of a particular one or more latency event types. The incrementing at 250 may comprise incrementing, at a first counter, a first count of latency events which are each of a respective latency event type of a first one or more latency event types. In such an embodiment, the first counter may be reconfigured at some point between a first configuration and a second configuration—e.g., wherein the first configuration is to maintain the first count, and the second configuration is to maintain a count of latency events which are each of a respective latency event type of a second one or more latency event types Some embodiments generate, based on the event signals, multiple data items which are each to report a different respective latency event. Based on the multiple data items, multiple latency event counts may be concurrently maintained each by different respective counter—e.g., the latency event counts each corresponding to a different respective one or more latency event types. In such embodiments, a first one or more latency event types corresponding to a first count may include a latency event type which is also included in a second one or more latency event types corresponding to another concurrently-maintained count.

Figure 3:
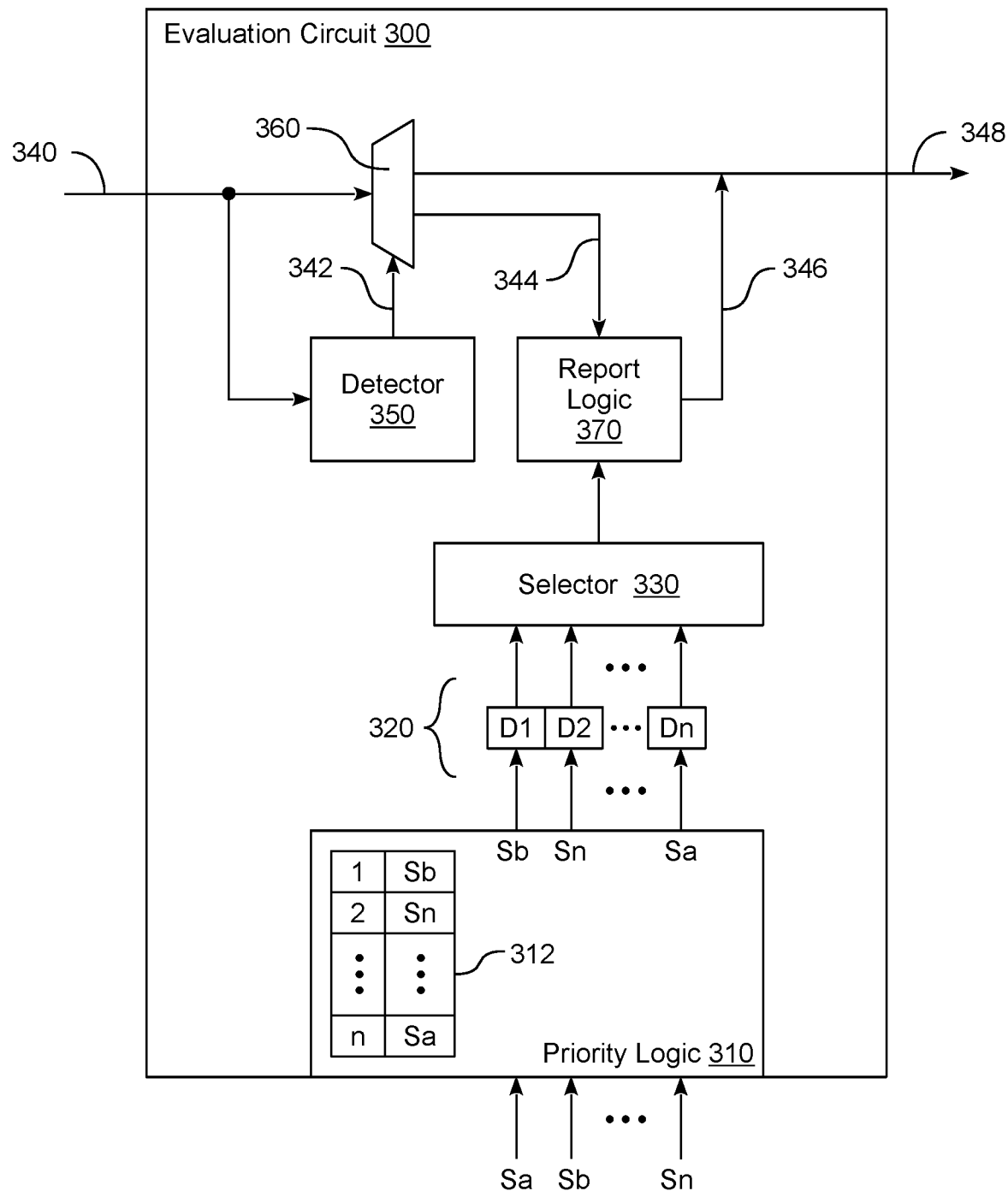
FIG. 3 is a functional block diagram illustrating elements of an evaluation circuit to determine a communication of latency information according to an embodiment.

FIG. 3 shows features of an evaluation circuit 300 to identify a latency event in a processing pipeline according to an embodiment. Evaluation circuit 300 is one example of an embodiment wherein circuitry provides for a selection from among multiple event signals which are variously prioritized relative to one another, the selection to determine a latency event which is to be represented in an event count or other performance monitoring information. Evaluation circuit 300 may include some or all of the features of evaluation circuit 140—e.g., wherein evaluation circuit 300 is to perform one or more operations of method 200.

As shown in FIG. 3, evaluation circuitry may be coupled to receive multiple event signals (such as the illustrative event signals Sa, Sb, . . . , Sn shown) each from a respective circuit block of a pipeline in which evaluation circuit 300 is to operate. At different times during operation of such a pipeline, event signals Sa, Sb, . . . , Sn may variously indicate different combinations of one or more latency events each at a respective circuit block. A selector 330 of evaluation circuit 300 may select one such event signal—e.g., in response to a trigger event—to determine a latency event (indicated by the selected event signal) which is to be represented with an output signal 348 from evaluation circuit 300.

For example, evaluation circuit 300 may receive an input signal 340 from an upstream circuit block (not shown) of the pipeline. A detector 350 of evaluation circuit 300 may snoop or otherwise evaluate input signal 340 to detect for a failure of that upstream circuit block to receive information necessary to perform a task—e.g., wherein such a failure contributes to a wasted slot. In the absence of any such failure, input signal 340 may simply be forwarded through evaluation circuit 300—e.g., via a demultiplexer (DMUX) 360 and/or other such switching circuitry thereof.

Alternatively, detection of such a failure may trigger detector 350 to operate DMUX 360—e.g., with a control signal 342—to selectively route some subsequent communication of input signal 340 for additional processing. For example, a next sub-instruction—subsequent to the detected failure—may be routed from DMUX 360, via a signal path 344, to report logic 370 of evaluation circuit 300. Report logic 370 may tag this next sub-instruction (e.g., a micro-operation) with a bit or other marker which describes or otherwise reports an instance of a latency event. The latency event to be indicated by such a tag may be based on the selection of one of event signals Sa, Sb, . . . , Sn by a selector 330 of evaluation circuit 300.

The selection of one of event signals Sa, Sb, . . . , Sn by selector 330 may be based on different priority levels which are variously assigned each to a respective one of event signals Sa, Sb, . . . , Sn. By way of illustration and not limitation, evaluation circuit 300 may include or couple to priority logic 310 which defines or otherwise provides an ordering 312, by priority, of event signals Sa, Sb, . . . , Sn relative to one another.

In the example scenario shown, ordering 312 defines event signals Sb, Sn and Sa as being (respectively) a highest priority signal, a second highest priority signal, and a lowest priority signal. In one such embodiment, event signals Sa, Sb, . . . , Sn may be presented to selector 300, according to ordering 312, in a manner which facilitates efficient selection of a highest priority event signal, a sample of which indicates a respective latency event. For example, priority logic 310 may output event signals according to ordering 312—e.g., wherein event signal Sb is in communicated via a highest priority signal path, event signal Sn is in communicated via a second highest priority signal path, and event signal Sa is in communicated via a lowest priority signal path. Any of a variety of other mechanisms may be used, in different embodiments, to indicate to selector 330 the respective priority levels of event signals Sa, Sb, . . . , Sn.

In such an embodiment, selector 330 may begin by sampling the highest priority event signal Sb and determining whether the sample indicates a latency event at the circuit block to which event signal Sb corresponds. Where the sample of event signal Sb indicates such a latency event, selector 330 may signal report logic 370 to include an indication of that latency event in a communication, via a signal path 346, which is to be part of the output signal 348 from evaluation circuit 300. Where the sample of event signal Sb instead fails to indicate any such latency event, selector 330 may move on to sampling and evaluating the next highest priority event signal Sn. In a like manner, selector 330 may continue processing successively lower priority event signals until the sample of one such event signal indicates a latency event which report logic 370 is to represent in output signal 348.

In some embodiments, evaluation circuit 300 may further comprise signal delay circuitry 320 to variously apply respective delays to event signals—e.g., wherein different delays D1, D2, . . . , Dn are applied (respectively) to the ordered event signals Sb, Sn, . . . , Sa. The application of such delays D1, D2, . . . , Dn may be associated with the relative arrangements of corresponding circuit blocks along the pipeline. For example, a lower priority first event signal may be received from a first circuit block which is relatively far from evaluation circuit 300—e.g., where a higher priority second event signal is received from a second circuit block which is coupled between the first circuit block and evaluation circuit 300. Processing by the second circuit block at a given time may be based on other processing by the first circuit block at an earlier time. In such an embodiment, the first event signal may, at some point, be delayed relative to the second event signal so that respective samples of the first event signal and the second event signal are associated with corresponding processing times which are relevant to one another. In an alternative embodiment, some or all of signal delay circuitry 320 is located in front of priority logic 310. In still other embodiments, one or both of signal delay circuitry 320 and priority logic 310 are instead coupled between evaluation circuit 300 and one or more circuit blocks of the pipeline.

Figure 4:
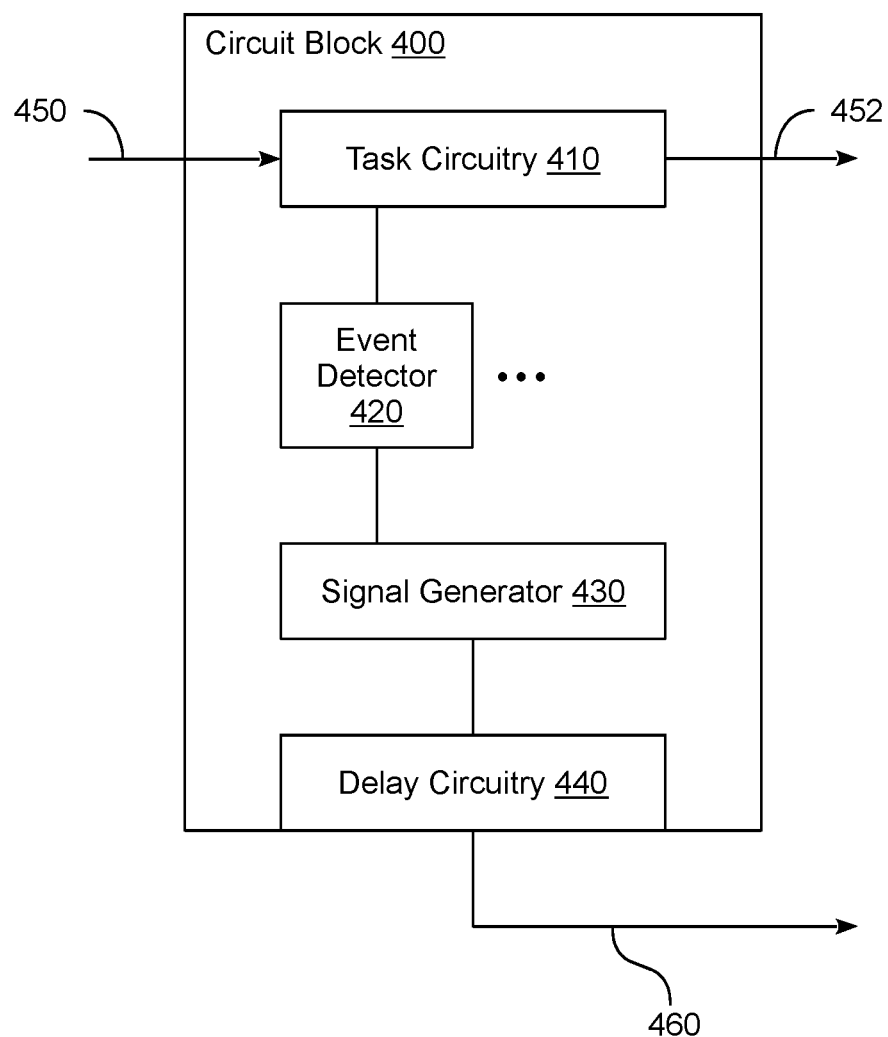
FIG. 4 is a functional block diagram illustrating elements of a circuit block to communicate latency information along a pipeline according to an embodiment.

FIG. 4 shows features of a circuit block 400 to provide latency event information according to an embodiment. Circuit block 400 is one example of an embodiment which is to communicate an event signal such as one which is received at 220 of method 200—e.g., wherein circuit block 400 includes some or all of the features of one of CBs 112, . . . , 114.

As shown in FIG. 4, circuit block 400 may include circuitry—such as the illustrative task circuitry 410 shown—which is coupled to receive and operate on an input 450 provided by some upstream circuit block (not shown) of a pipeline which is to include circuit block 400. Task circuitry 410 may perform some task of a workload (e.g., including the processing of an instruction) which has been provided to the pipeline—e.g., wherein any result of such a task may be communicated as an output signal 452 from circuit block 400 to a next circuit block of the pipeline. Task circuitry 410 may be configured to perform any of a variety of tasks that, for example, are supported in a front-end pipeline of some conventional processor cores. Some embodiments are not limited with respect to a particular functionality that may be provided with task circuitry 410.

To facilitate performance monitoring according to some embodiments, circuit block 400 may further comprise one or more detection circuits (e.g., including the illustrative event detector 420 shown) which are each coupled to detect whether an attempt to perform a task with task circuitry 410 has resulted in, or is to result in, a respective latency event. By way of illustration and not limitation, task circuitry 410 may implement functionality of an instruction translation lookaside buffer (ITLB), or an instruction cache, which experiences a miss. Alternatively or in addition, an instruction cache of task circuitry 410 may receive bytes which are insufficient to find a complete instruction. In another embodiment, task circuitry 410 may provide instruction decoder functionality which experiences a decode restriction relating to decoding past a speculative execution branch which has been taken. Alternatively or in addition, such an instruction decoder may encounter translation issues and/or may discover one or more unconditional branches that were not predicted by a branch predictor. In some embodiments, task circuitry 410 may experience a redirection in instruction pointer generation, where the redirection is triggered by a branch prediction unit included in or coupled to circuit block 400. In still other embodiments, task circuitry 410 may encounter instruction bytes jumping into microcode, resulting in an entry penalty. Alternatively or in addition, within microcode there may be micro-jumps and/or other alignment issues which contribute to timing bubbles. Some or all such latency events may have the potential to delay some later task to be performed downstream in the pipeline, such as the delivery of a sub-instruction (e.g., a micro-operation) to an allocation engine.

In response to the detection of a latency event by event detector 420 (and/or by any other such detection logic of circuit block 400), a signal generator may communicate an event signal 460 from circuit block 400. The event signal 460 may be communicated along a signal path which is parallel to at least a portion of the pipeline—e.g., wherein the signal path extends past one or more other circuit blocks of the pipeline to a pipeline component such as one of evaluation circuits 140, 300. Although some embodiments are not limited in this regard, circuit block 400 may further comprise delay circuitry 440 to apply a time delay to event signal 460 prior to communication from circuit block 400. In other embodiments, such functionality of delay circuitry 440 may instead be implemented at an evaluation circuit which is to receive event signal 460.

Figure 5:
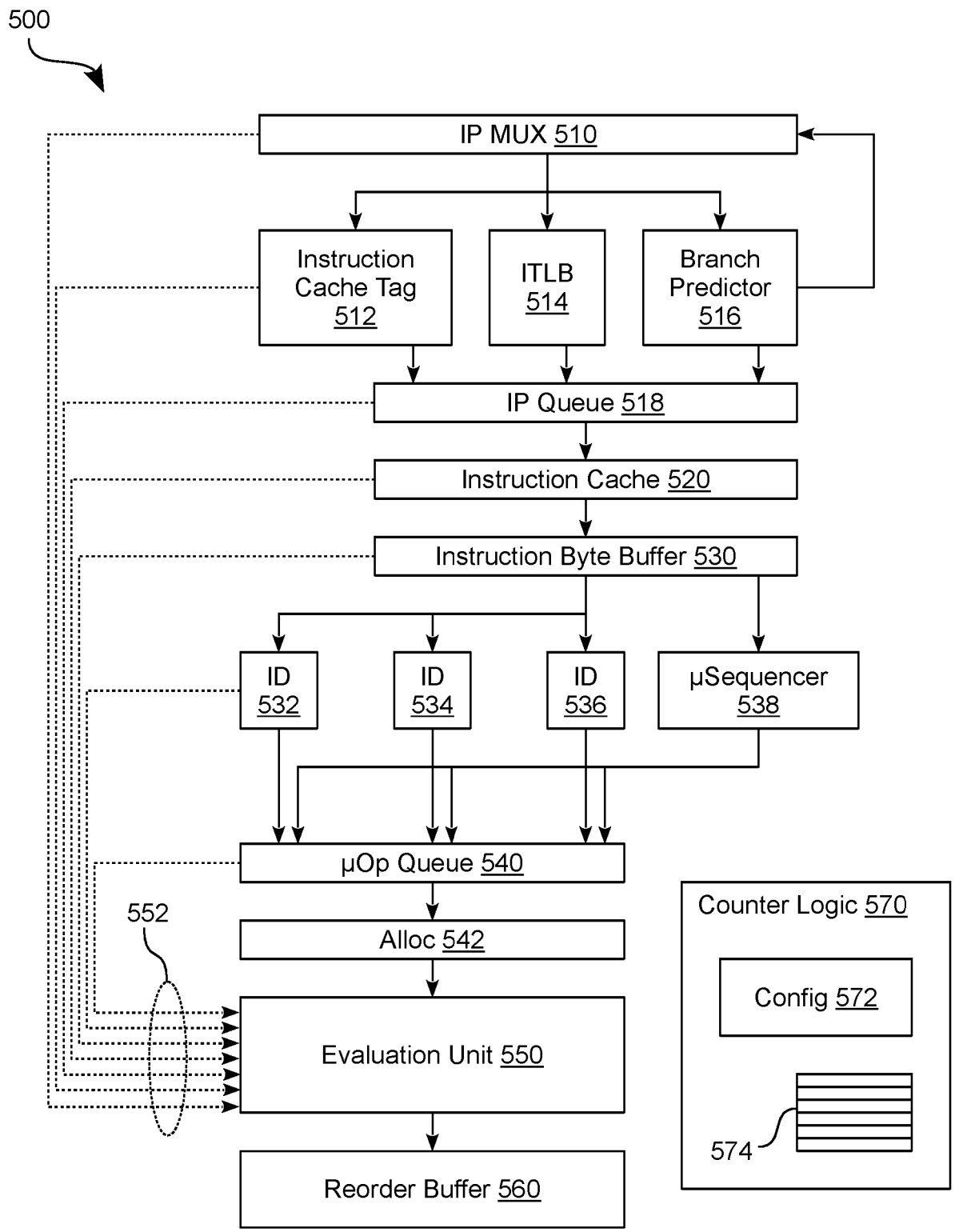
FIG. 5 is a functional block diagram illustrating elements of a circuit device to communicate latency information according to an embodiment.

FIG. 5 shows features of a device 500 to detect latency in a pipeline according to an embodiment. Device 500 is one example of an embodiment wherein a pipeline which includes an evaluation circuit—such as one of evaluation circuits 140, 300—is a front-end pipeline of a processor to perform operations such as those of method 200.

As shown in FIG. 5, circuit device 500 may include a pipeline comprising circuit blocks which are each to perform a respective task of a workload that is provided to the pipeline. Various ones of such circuit blocks, arranged in an in-series configuration, may belong to an in-order domain of the pipeline. Although some embodiments are not limited in this regard, a given portion of such an in-series configuration may itself include circuit blocks which are coupled in parallel with each other. However, such an in-parallel arrangement of circuit blocks may, as a whole, be coupled in series with other circuit blocks of the pipeline.

In the example embodiment shown, circuit blocks of the pipeline include an instruction pointer (IP) multiplexer (MUX) 510 to select one of multiple incoming instruction addresses for fetching instructions. The circuit blocks may further comprise an instruction cache tag 512 and an instruction translation lookaside buffer (ITLB) 514 to facilitate the retrieving of a cached instruction which is indicated by an IP from IP MUX 510. The circuit blocks may further comprise a branch predictor 516 which is configured to predict an outcome of a branch instruction—e.g., where, in some embodiments, the pipeline speculatively executes one or more subsequent instructions along the predicted path. In such an embodiment, one or more of instruction cache tag 512, ITLB 514, and branch predictor 516 may variously provide, to an IP queue 518 of the pipeline, respective pointers for instructions (or sub-instructions) to be executed in sequence with each other.

Based on a pointer from IP queue 518, an instruction cache 520 of the pipeline may attempt to retrieve any cached versions of a corresponding instruction (or sub-instruction) which has been recently executed. A hit at instruction cache 520 may result in an instruction byte buffer 530 storing raw bytes of an instruction (or sub-instruction) retrieved from instruction cache 520. Alternatively, a microsequencer 538 of the pipeline may fetch an instruction (or sub-instruction) which, for example, was not found in instruction cache 520.

In some embodiments, the circuit blocks of further include instruction decoders (IDs) 532, 534, 536 each to variously decode at least in part a respective instruction (or sub-instruction) which has been provided via instruction byte buffer 530. Some or all of IDs 532, 534, 536 and microsequencer 538 may variously provide respective microoperations each to a microoperation (µOp) queue 540. An allocation and rename unit (Alloc) 542 of the pipeline may be coupled to successively receive various microoperations as they are dequeued from µOp queue 540. In preparation for execution of such microoperations, Alloc 542 may operate to determine the allocation and naming of registers to be variously associated each with a respective microoperation.

To facilitate the determining of performance monitoring information, some or all circuit blocks of the pipeline provided by circuit device 500 may each detect for a respective latency event and, based on such detection, communicate a respective event signal in parallel with at least a portion of the pipeline. By way of illustration and not limitation, event signals 552 may be variously communicated each from a respective circuit block of the pipeline to an evaluation unit 550. Some examples of latency events that may be variously indicated each by a respective one of event signals 552 include, but are not limited to, a branch redirection at an instruction decoder, bad predecode bits at an instruction decoder, issues at an instruction decoder which are unrelated to predecode behavior, an ITLB miss, an instruction cache miss, an incorrect branch prediction and/or the like. Some or all such latency events may potentially result, under certain conditions, in the wasting of an opportunity to allocate an available slot of reorder buffer 560 to µOp provided from µOp queue 540 via Alloc 542.

In the example embodiment shown, evaluation unit 550 is coupled between Alloc 542 and a reorder buffer 560 of circuit device. Reorder buffer 560 may be operable to change an order of execution of microoperations which are provided sequentially via Alloc 542. Evaluation unit 550 may comprise circuitry to detect for a failure to communicate information in the pipeline—e.g., wherein the failure includes an inability of µOp queue 540 and/or Alloc 542 to receive, from upstream in the pipeline, information which is needed to perform one or more tasks. In response to such a failure, evaluation unit 550 may select one of event signals 552—e.g., where the selecting is based on a sampling of one or more event signals and further based on various respective priorities of event signals 552 relative to each other. Based on the selection, evaluation unit 550 may output data representing a latency event which is indicated by the selected event signal. The data may be used to tag a microoperation or other information output from evaluation unit 550.

In some embodiments such data may be used to increment a value representing a count of latency events which are each of a respective event type of a particular one or more event types being monitored. For example, circuit device 500 may further comprise counter logic 570 including multiple counters 574 and, in some embodiments, configuration circuitry 572 which is operable to configure some or all of counters 574 each to detect for a respective one or more types of latency events. Counter logic 570 may be coupled to receive, snoop and/or otherwise detect an indication of a latency event, where said indication is provided in a communication from evaluation unit 550. In such an embodiment, counters 574 may be configured to concurrently maintain two or more counts which each correspond to a different respective one or more types of latency events. Accordingly, circuit device 500 may variously update the two or more counts during servicing of the same one or more instructions with the pipeline.

Figure 6:
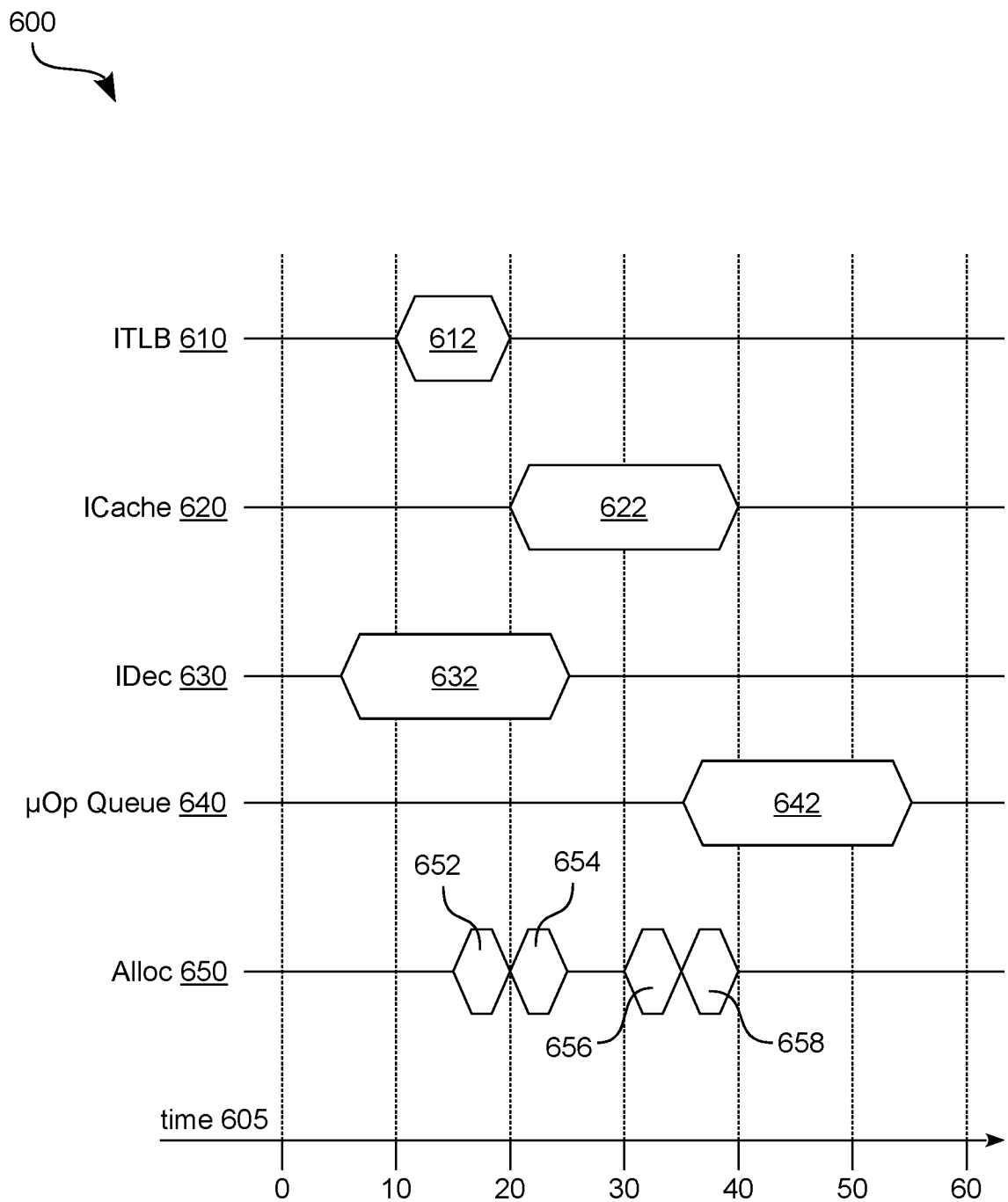
FIG. 6 is a timing diagram illustrating signals communicated by pipeline circuitry according to an embodiment.

FIG. 6 shows a timing diagram 600 illustrating a communication of latency information in a processing pipeline according to an embodiment. Communication of the signals represented in timing diagram 600 may be performed, for example, with one of circuit devices 100, 500—e.g., where operations of method 200 include performing some or all such communications.

In FIG. 6, timing diagram 600 shows event signal ITLB 610 from an instruction translation lookaside buffer (such as ITLB 514, for example), and event signal ICache 620 from an instruction cache such as instruction cache 520. Timing diagram 600 further shows event signal IDec 630 from an instruction decoder and event signal µOp queue 640 from a microoperations queue. Such event signaling may be communicated, in parallel to the pipeline, each to an evaluation circuit during a sequence of operational cycles 0 through 60 of the pipeline.

The event signals shown in timing diagram 600 may be variously prioritized relative to each other—e.g., wherein the prioritizing is based on the locations, along the pipeline, of the respective circuit blocks which variously provide such event signals. For example, an ordering of the event signals shown—from lowest priority to highest priority—may be ITLB 610, ICache 620, IDec 630, and µOp queue 640. Alternatively or in addition, one or more of the event signals, as shown in timing diagram 600, may each have a respective signal time delay applied thereto. For example, a time delay which has been applied to ITLB 610 may be smaller than a time delay which has been applied to ICache 620 which, in turn, may be smaller than a time delay which has been applied to IDec 630. The time delay which has been applied to IDec 630 may be smaller than a time delay (if any) which has been applied to µOp queue 640. Such timing delays may facilitate an evaluation of a relevant set of samples of the various event signals.

For example, the evaluation circuit may operate, in response to some trigger event, to select an event signal and determine, based on the selected event signal, a corresponding latency event which is to be represented in an event count and/or other performance monitoring information. Examples of such trigger events may include instances 652, 654, 656, 658 wherein some other pipeline resource (such as the illustrative register allocation unit Alloc 650) fails to receive information from an upstream circuit block. In the example scenario shown, instance 652 occurs in a time period from cycle 15 through cycle 19, during which respective samples of ITLB 610 and IDec 630 (the sampling at the evaluation circuit) indicate corresponding latency events 612, 632. Due to IDec 630 being associated with a higher priority than that of ITLB 610, the evaluation circuit may signal that latency event 632 is to be represented (for example) in a count of latency events. Since latency event 612 may be mooted by (or "in the shadow" of) the downstream latency event 632, the evaluation circuit may forego signaling any representation of latency event 612 in response to instance 652.

In a similar way, instance 654 may occur in a time period from cycle 20 through cycle 24, during which respective samples of ICache 620 and IDec 630 indicate corresponding latency events 622, 632 (but after ITLB 610 has stopped indicating latency event 612). Due to IDec 630 being associated with a higher priority than that of ICache 620, the evaluation circuit may again signal that latency event 632 is to be represented in the count of latency events—e.g., wherein more than one slot has been wasted due to latency event 632. The evaluation circuit may forego signaling any representation of the potentially mooted latency event 622 in response to instance 654.

The example scenario also includes an instance 656 which occurs in a time period from cycle 30 through cycle 34, during which ICache 620 indicates latency event 622 (but where no sample of a higher priority event signal indicates any other latency event). Since no higher priority latency event is masking latency event 622, the evaluation circuit may signal that latency event 622 is to be represented in performance monitoring information. The example scenario also includes an instance 658 which occurs in a time period from cycle 35 through cycle 39, during which respective samples of ICache 620 and µOp queue 640 indicate corresponding latency events 622, 642. Due to µOp queue 640 being associated with a higher priority than that of ICache 620, the evaluation circuit may again signal that latency event 642 is to be represented in performance monitoring information—e.g., where the evaluation circuit foregoes signaling a second representation of latency event 622 in the same or other performance monitoring information.

Figures 7A, 7B:
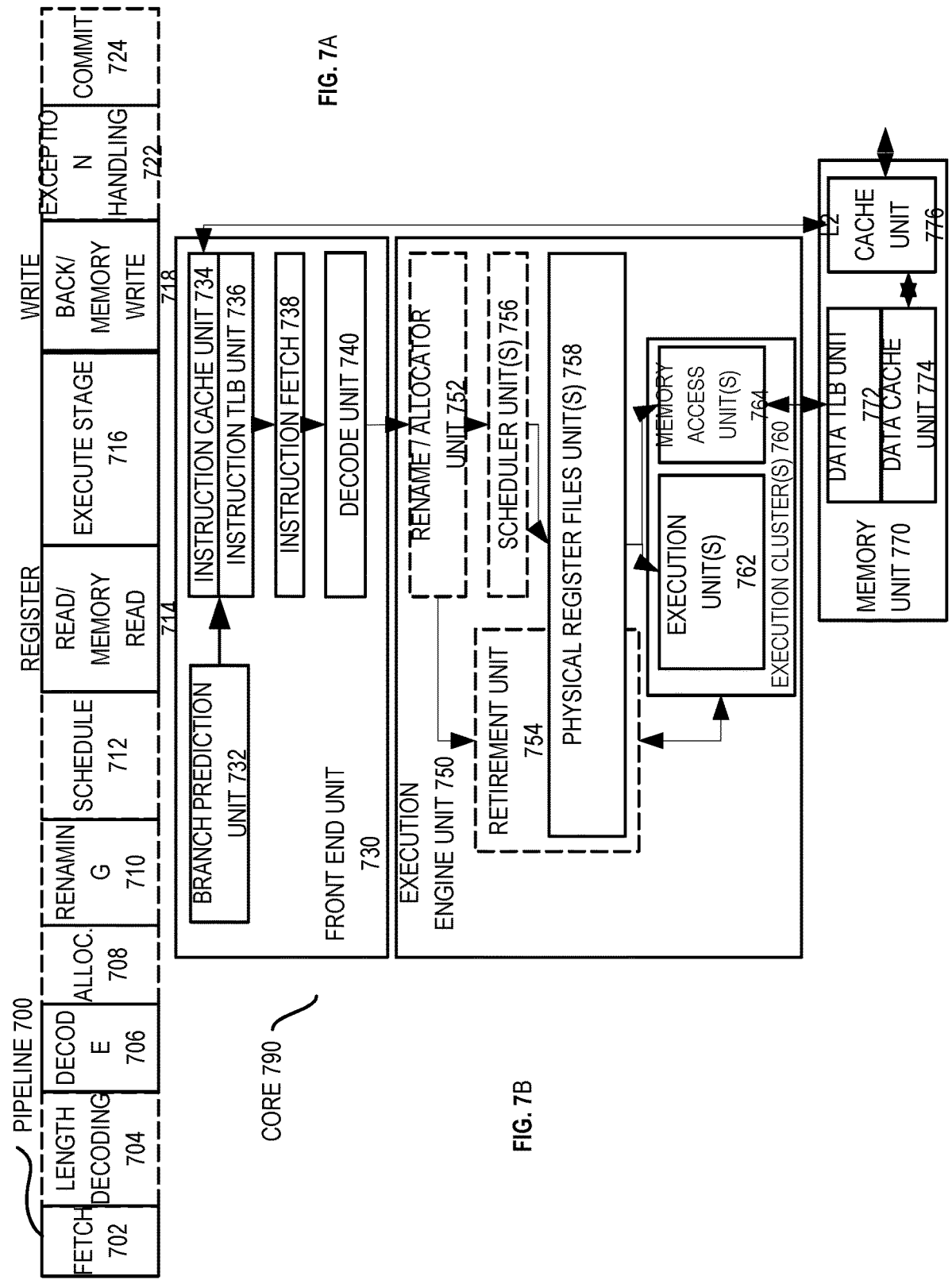
FIG. 7A is a block diagram illustrating both an exemplary in-order pipeline and an exemplary register renaming, out-of-order issue/execution pipeline according to an embodiment.
FIG. 7B is a block diagram illustrating both an exemplary embodiment of an in-order architecture core and an exemplary register renaming, out-of-order issue/execution architecture core to be included in a processor according to an embodiment.

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 8A:
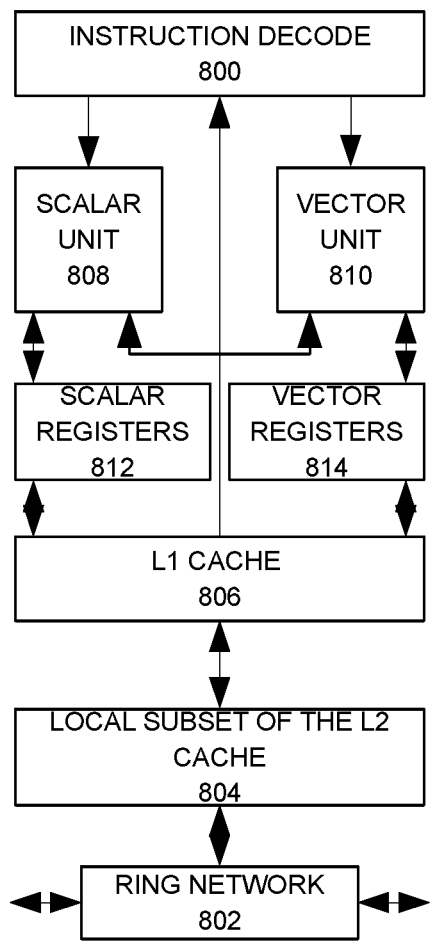
FIGS. 8A-B illustrate a block diagram of a more specific exemplary in-order core architecture, which core would be one of several logic blocks (including other cores of the same type and/or different types) in a chip.
Figure 8B:
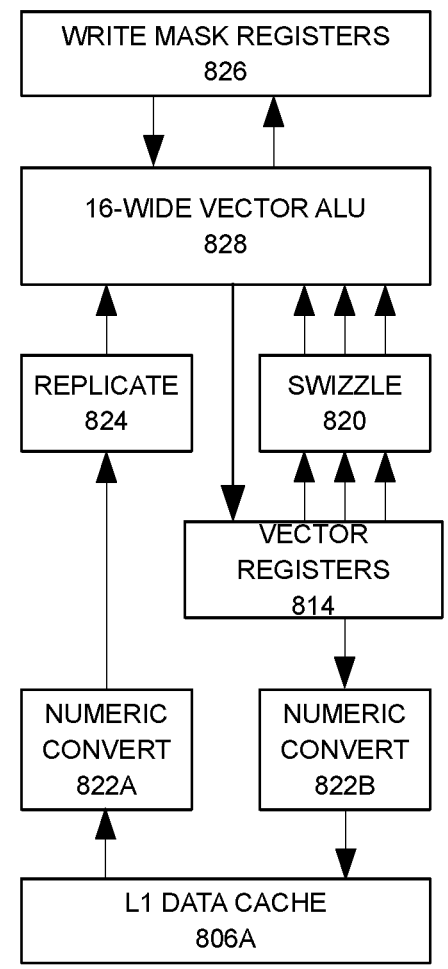

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Figure 9:
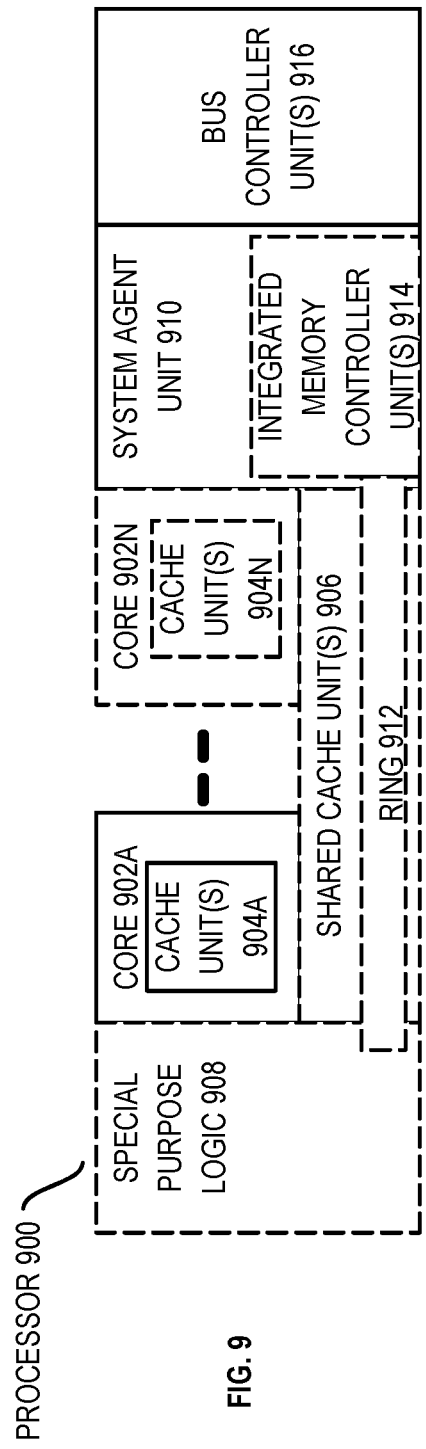
FIG. 9 is a block diagram of a processor that may have more than one core, may have an integrated memory controller, and may have integrated graphics according to an embodiment.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902A-N.

In some embodiments, one or more of the cores 902A-N are capable of multithreading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
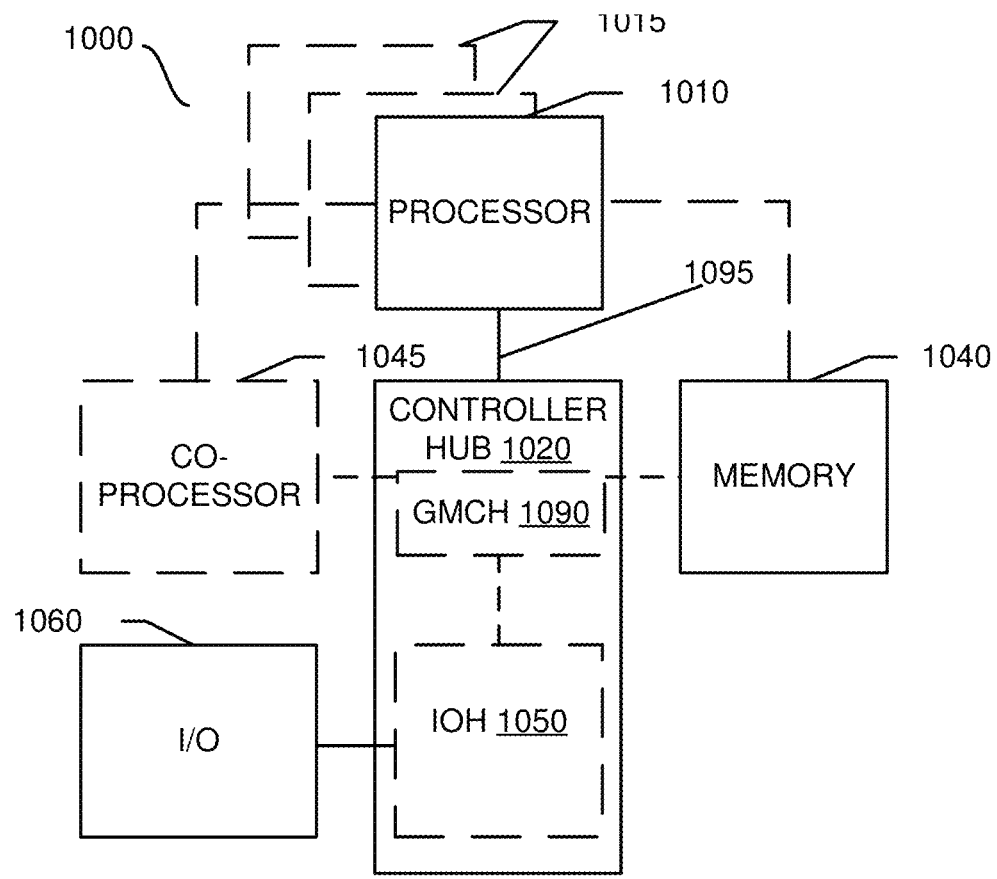
FIGS. 10-13 are block diagrams of exemplary computer architectures each according to a respective embodiment.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
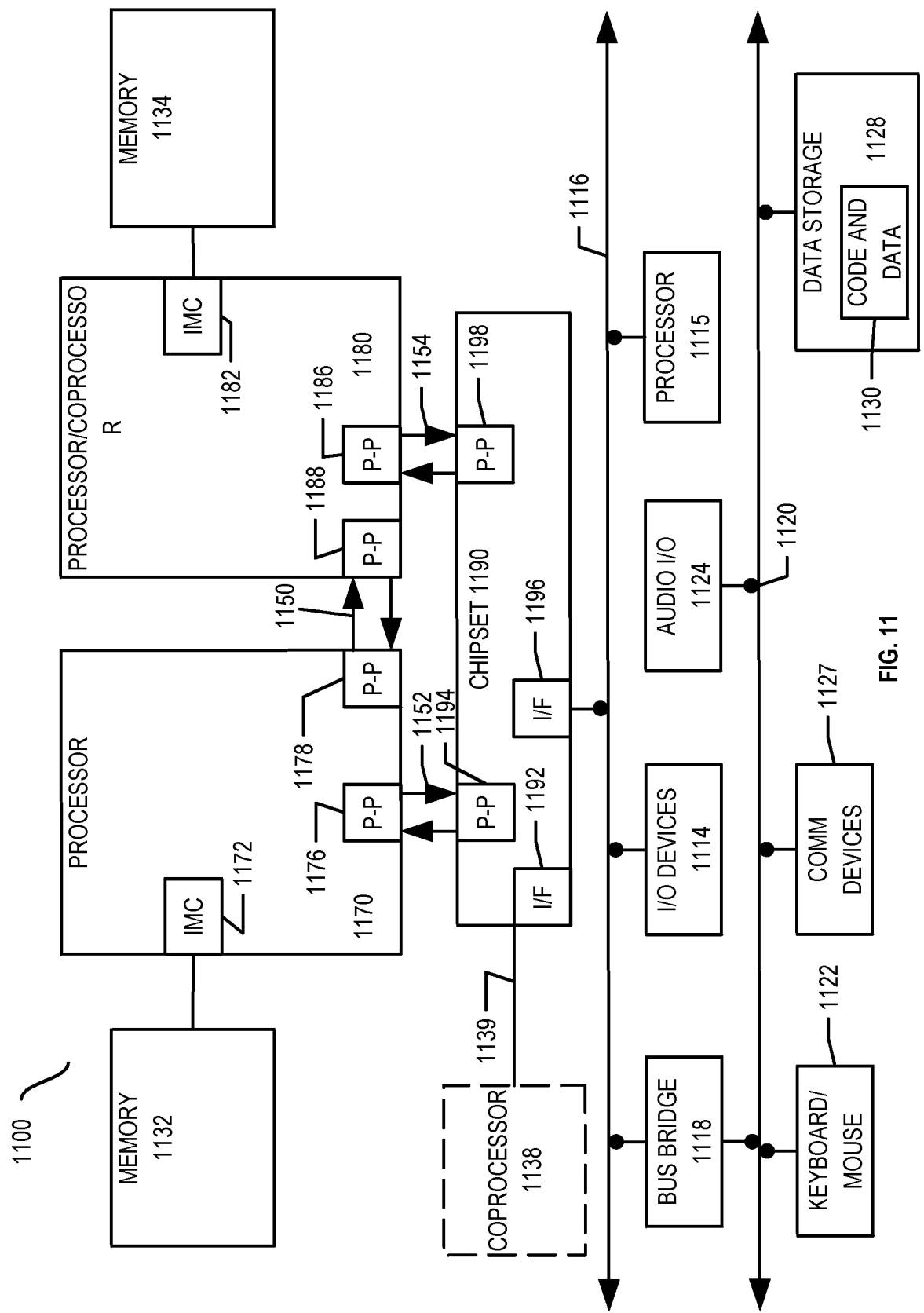

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
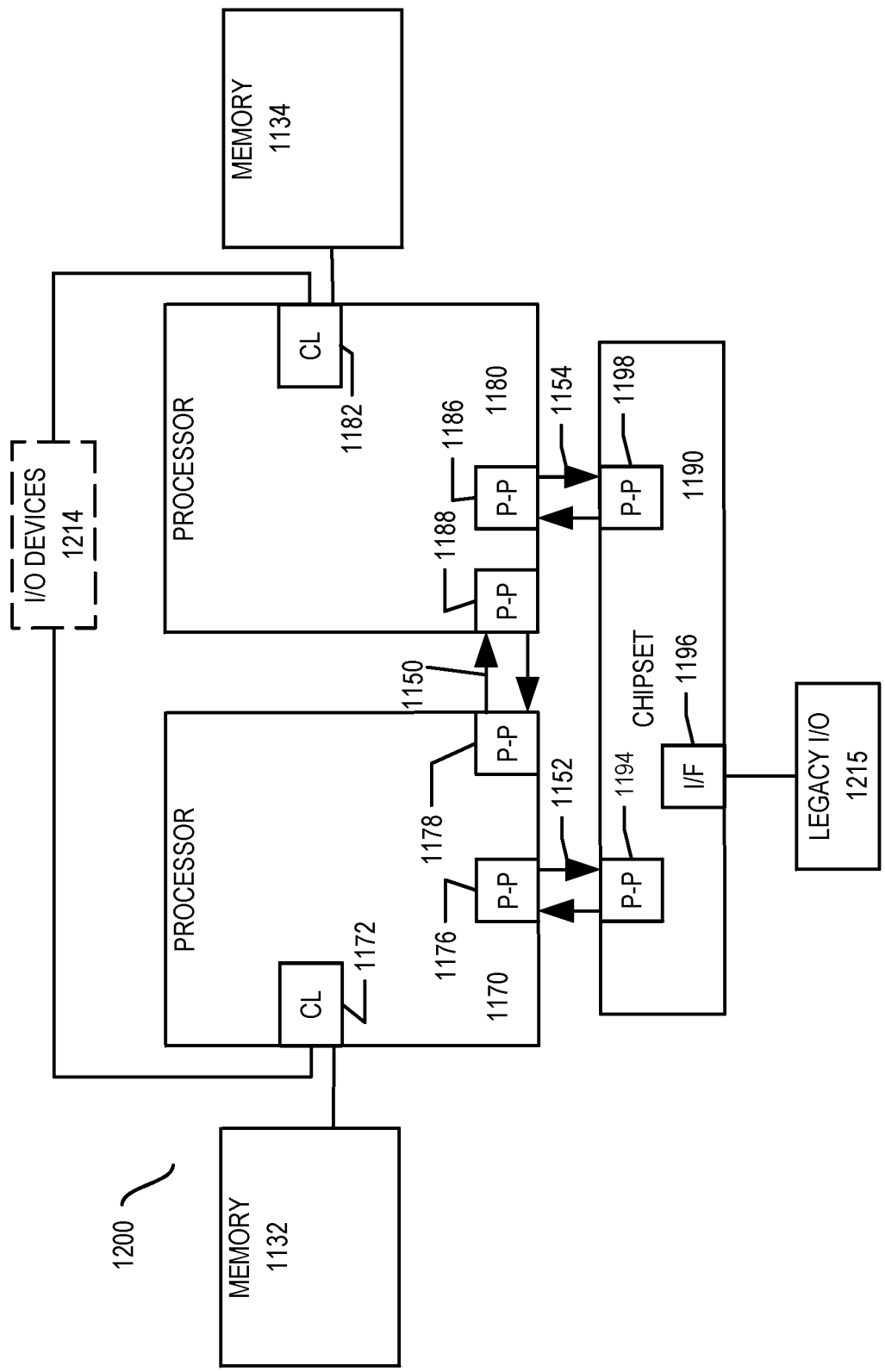

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
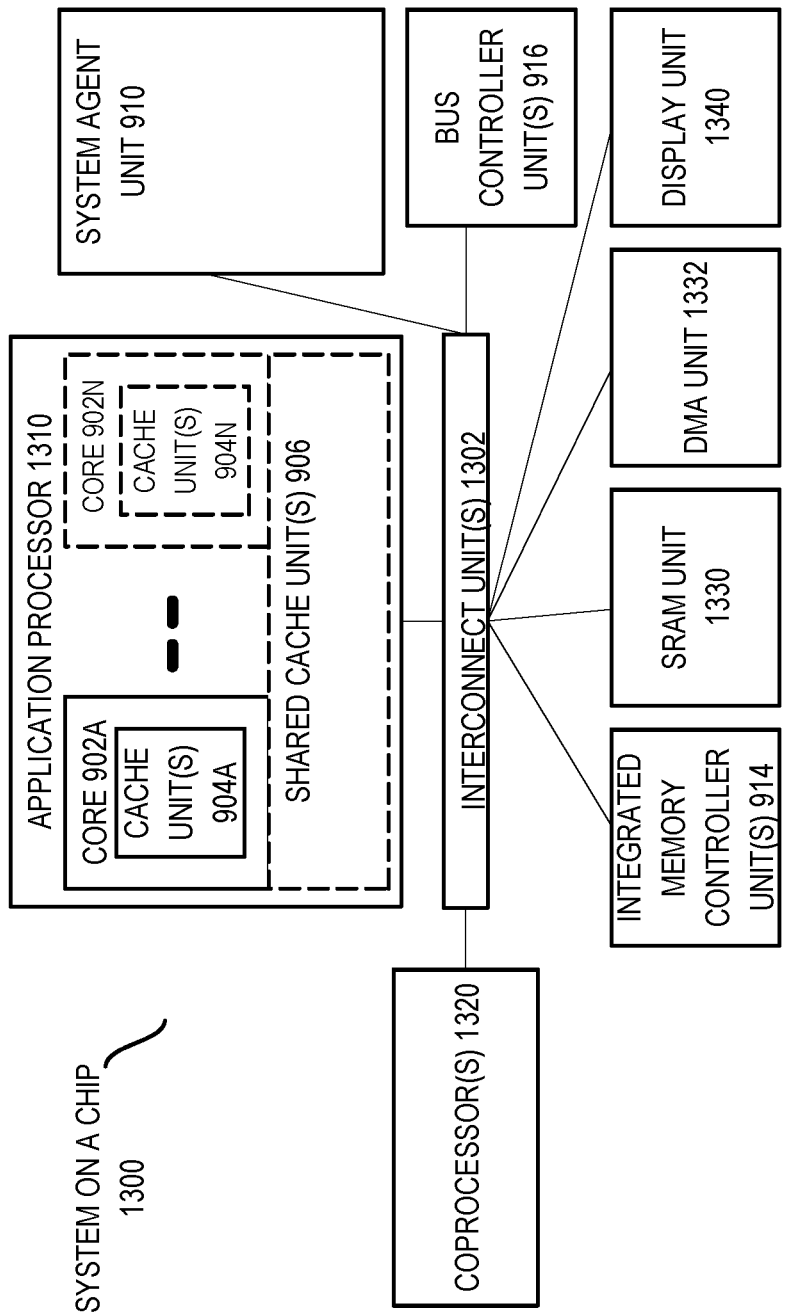

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, CA and/or that execute the ARM instruction set of ARM Holdings of Sunnyvale, CA). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

Example 1 is a circuit device for providing performance monitoring information, the circuit device comprising a pipeline comprising circuit blocks each to perform a respective task based on an instruction, and an evaluation circuit coupled to the circuit blocks, the evaluation circuit to receive event signals each from a different respective one of the circuit blocks via a respective path in parallel with an in-series configuration of at least some of the circuit blocks, the event signals each to indicate whether a respective latency event is detected, select a first event signal of the event signals based on a prioritization of the event signals relative to each other, and further based on an indication of a latency event by a sample of the first event signal, and generate data, based on the selected first event signal, used to report a first latency event at a first circuit block of the circuit blocks.

In Example 2, the subject matter of Example 1 optionally includes wherein the evaluation circuit is further to detect a failure to communicate information in the pipeline, wherein the data used to report the first latency event is to be generated responsive to the detected failure to communicate information in the pipeline.

In Example 3, the subject matter of Example 2 optionally includes wherein the evaluation circuit is further to provide the data used to report the first latency event with a communication of a first sub-instruction based on a determination that the first sub-instruction is a next sub-instruction after the failure to communicate information in the pipeline.

In Example 4, the subject matter of Example 3 optionally includes wherein the data used to report the first latency event includes first data, and the evaluation circuit is further to generate, based on the event signals, second data used to report a second latency event at the circuit blocks, and provide the second data to a reorder buffer in the communication of the first sub-instruction with the first data.

In Example 5, the subject matter of any one or more of Examples 1 and 2 optionally includes the circuit device further comprising a first counter coupled to the evaluation circuit, the first counter to increment a first count of at least some latency events based on an output of the data from the evaluation circuit.

In Example 6, the subject matter of Example 5 optionally includes wherein the first count is a count of latency events each of a respective event type of a first one or more latency event types, the circuit device further comprising count configuration circuitry coupled to the evaluation circuit, the count configuration circuitry to reconfigure the first counter between a first configuration and a second configuration, the first configuration to maintain the first count, the second configuration to maintain a count of latency events each of a respective event type of a second one or more latency event types.

In Example 7, the subject matter of any one or more of Examples 1 and 2 optionally includes wherein the evaluation circuit is to generate multiple data items based on the event signals, the multiple data items each to indicate a different respective latency event, the circuit device further comprising a first counter and a second counter each coupled to the evaluation circuit, the first counter and the second counter to concurrently maintain a first count of latency events each of a respective event type of a first one or more latency event types and a second count of latency events each of a respective event type of a second one or more latency event types.

In Example 8, the subject matter of Example 7 optionally includes wherein the first one or more latency event types includes one of the second one or more latency event types.

In Example 9, the subject matter of any one or more of Examples 1 and 2 optionally includes wherein the evaluation circuit or the circuit blocks further comprise circuitry to apply one or more delays each to a respective one of the event signals.

In Example 10, the subject matter of any one or more of Examples 1, 2 and 9 optionally includes wherein the prioritization of the event signals relative to each other is according to relative positions of the circuit blocks in the pipeline.

In Example 11, the subject matter of any one or more of Examples 1, 2, 9 and 10 optionally includes wherein the pipeline is a front-end pipeline of a processor.

Example 12 is a method for providing performance monitoring information, the circuit device comprising wherein circuit blocks of the pipeline each perform a respective task based on the instruction, and, at an evaluation circuit of the pipeline, receiving event signals each from a different respective one of the circuit blocks via a respective path in parallel with an in-series configuration of at least some of the circuit blocks, the event signals each to indicate whether a respective latency event is detected, selecting a first event signal of the event signals based on a prioritization of the event signals relative to each other, and further based on an indication of a latency event by a sample of the first event signal, and generating data, based on the selected first event signal, used to report a first latency event at a first circuit block of the circuit blocks.

In Example 13, the subject matter of Example 12 optionally includes the method further comprising at the evaluation circuit, detecting a failure to communicate information in the pipeline, wherein the data used to report the first latency event is generated responsive to the detected failure to communicate information in the pipeline.

In Example 14, the subject matter of Example 13 optionally includes the method further comprising, at the evaluation circuit, providing the data used to report the first latency event with a communication of a first sub-instruction based on a determination that the first sub-instruction is a next sub-instruction after the failure to communicate information in the pipeline.

In Example 15, the subject matter of Example 14 optionally includes wherein the data used to report the first latency event includes first data, the method further comprising, at the evaluation circuit, generating, based on the event signals, second data used to report a second latency event at the circuit blocks, and providing the second data to a reorder buffer in the communication of the first sub-instruction with the first data.

In Example 16, the subject matter of any one or more of Examples 12 and 13 optionally includes the method further comprising, with a first counter coupled to the evaluation circuit, incrementing a first count of at least some latency events based on an output of the data from the evaluation circuit.

In Example 17, the subject matter of Example 16 optionally includes wherein the first count is a count of latency events each of a respective event type of a first one or more latency event types, the method further comprising reconfiguring the first counter between a first configuration and a second configuration, the first configuration to maintain the first count, the second configuration to maintain a count of latency events each of a respective event type of a second one or more latency event types.

In Example 18, the subject matter of any one or more of Examples 12 and 13 optionally includes wherein the evaluation circuit generates multiple data items based on the event signals, the multiple data items each indicating a different respective latency event, the method further comprising, with a first counter and a second counter, concurrently maintaining a first count of latency events each of a respective event type of a first one or more latency event types, and a second count of latency events each of a respective event type of a second one or more latency event types.

In Example 19, the subject matter of Example 18 optionally includes wherein the first one or more latency event types includes one of the second one or more latency event types.

In Example 20, the subject matter of any one or more of Examples 12 and 13 optionally includes the method further comprising applying one or more delays each to a respective one of the event signals.

In Example 21, the subject matter of any one or more of Examples 12, 13 and 20 optionally includes wherein the prioritization of the event signals relative to each other is according to relative positions of the circuit blocks in the pipeline.

In Example 22, the subject matter of any one or more of Examples 12, 13, 20 and 21 optionally includes wherein the pipeline is a front-end pipeline of a processor.

Example 23 is a system for providing performance monitoring information, the system comprising a circuit device comprising a pipeline comprising circuit blocks each to perform a respective task based on an instruction, and an evaluation circuit coupled to the circuit blocks, the evaluation circuit to receive event signals each from a different respective one of the circuit blocks via a respective path in parallel with an in-series configuration of at least some of the circuit blocks, the event signals each to indicate whether a respective latency event is detected, select a first event signal of the event signals based on a prioritization of the event signals relative to each other, and further based on an indication of a latency event by a sample of the first event signal, and generate data, based on the selected first event signal, used to report a first latency event at a first circuit block of the circuit blocks. The system further comprises a display device coupled to the circuit device, the display device to display an image based on a signal communicated with the display device.

In Example 24, the subject matter of Example 23 optionally includes wherein the evaluation circuit is further to detect a failure to communicate information in the pipeline, wherein the data used to report the first latency event is to be generated responsive to the detected failure to communicate information in the pipeline.

In Example 25, the subject matter of Example 24 optionally includes wherein the evaluation circuit is further to provide the data used to report the first latency event with a communication of a first sub-instruction based on a determination that the first sub-instruction is a next sub-instruction after the failure to communicate information in the pipeline.

In Example 26, the subject matter of Example 25 optionally includes wherein the data used to report the first latency event includes first data, and the evaluation circuit is further to generate, based on the event signals, second data used to report a second latency event at the circuit blocks, and provide the second data to a reorder buffer in the communication of the first sub-instruction with the first data.

In Example 27, the subject matter of any one or more of Examples 23 and 24 optionally includes the circuit device further comprising a first counter coupled to the evaluation circuit, the first counter to increment a first count of at least some latency events based on an output of the data from the evaluation circuit.

In Example 28, the subject matter of Example 27 optionally includes wherein the first count is a count of latency events each of a respective event type of a first one or more latency event types, the circuit device further comprising count configuration circuitry coupled to the evaluation circuit, the count configuration circuitry to reconfigure the first counter between a first configuration and a second configuration, the first configuration to maintain the first count, the second configuration to maintain a count of latency events each of a respective event type of a second one or more latency event types.

In Example 29, the subject matter of any one or more of Examples 23 and 24 optionally includes wherein the evaluation circuit is to generate multiple data items based on the event signals, the multiple data items each to indicate a different respective latency event, the circuit device further comprising a first counter and a second counter each coupled to the evaluation circuit, the first counter and the second counter to concurrently maintain a first count of latency events each of a respective event type of a first one or more latency event types and a second count of latency events each of a respective event type of a second one or more latency event types.

In Example 30, the subject matter of Example 29 optionally includes wherein the first one or more latency event types includes one of the second one or more latency event types.

In Example 31, the subject matter of any one or more of Examples 23 and 24 optionally includes wherein the evaluation circuit or the circuit blocks further comprise circuitry to apply one or more delays each to a respective one of the event signals.

In Example 32, the subject matter of any one or more of Examples 23, 24 and 31 optionally includes wherein the prioritization of the event signals relative to each other is according to relative positions of the circuit blocks in the pipeline.

In Example 33, the subject matter of any one or more of Examples 23, 24, 31 and 32 optionally includes wherein the pipeline is a front-end pipeline of a processor.

Techniques and architectures for providing performance monitoring of a circuit pipeline are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
a plurality of latency event counters, each latency event counter associated with a latency event type; and
an evaluation circuit to:
select one or more front end latency events to be counted from a plurality of signaled latency events, and each signaled latency event associated with a latency event type, wherein the fronted latency events are to be selected from one or more of a branch redirection, an instruction translation buffer (ITLB) miss, an instruction cache miss, and an incorrect branch prediction;
generate an update to cause one or more of the plurality of latency event counters to be updated based on the selected one or more latency event signals; and
associate an indication with an operation, the indication based on the plurality of latency event counters, and the indication identifying one or more latency events affecting the operation; and
a pipeline comprising a plurality of pipeline stages including the pipeline stage, and wherein the selecting is performed in response to an indication that one or more of the plurality of pipeline stages is missing information to perform a task.

2. The apparatus of claim 1, wherein the indication comprises a plurality of bits.

3. The apparatus of claim 2, wherein the selected one or more latency events comprises a plurality of selected latency events, and wherein each of the plurality of bits represents one of the plurality of selected latency events.

4. The apparatus of claim 1, wherein the operation is a micro-operation.

5. The apparatus of claim 1, wherein a latency event is a failure of task circuitry to perform an operation.

6. A computer-implemented method comprising:
selecting, by a processor, one or more front end latency event signals to be counted from a plurality of latency event signals, each latency event signal indicating a detection of latency in a pipeline stage, and each latency event signal associated with a latency event type, wherein the fronted latency events are to be selected from one or more of a branch redirection, an instruction translation buffer (ITLB) miss, an instruction cache miss, and an incorrect branch prediction;
generating, by the processor, an update signal to cause one or more plurality of latency event counters to be updated based on the selected one or more latency event signals; and
associating, by the processor, an indication with an operation, the indication based on the plurality of latency event counters, and the indication identifying one or more latency events affecting the operation, wherein the pipeline stage is one of a plurality of pipeline stages in a pipeline, and wherein the selecting is performed in response to an indication that one or more of the plurality of pipeline stages is missing information to perform a task.

7. The computer-implemented method of claim 6, wherein the indication comprises a plurality of bits.

8. The computer-implemented method of claim 6, wherein the operation is a micro-operation.

9. A non-transitory computer readable storage medium storing instructions which, when executed by a processor, cause the processor to perform operations comprising:
selecting one or more front end latency event signals to be counted from a plurality of latency event signals, each latency event signal indicating a detection of latency in a pipeline stage, and each latency event signal associated with a latency event type, wherein the fronted latency events are to be selected from one or more of a branch redirection, an instruction translation buffer (ITLB) miss, an instruction cache miss, and an incorrect branch prediction;
generating an update signal to cause one or more of a plurality of latency event counters to be updated based on the selected one or more latency event signals; and
associating an indication with an operation, the indication based on the plurality of latency event counters, and the indication identifying one or more latency events affecting the operation, wherein the pipeline stage is one of a plurality of pipeline stages in a pipeline, and wherein the selecting is performed in response to an indication that one or more of the plurality of pipeline stages is missing information to perform a task.

10. The non-transitory computer readable storage medium of claim 9, wherein the instructions further cause the processor to perform operations comprising:
receiving each of the plurality of latency event signals; and
generating a prioritization of the plurality of latency event signals based on a temporal evaluation of when each of the plurality of latency event signals were received by an evaluation circuit.

11. The non-transitory computer readable storage medium of claim 9, wherein the indication comprises a plurality of bits.

12. The non-transitory computer readable storage medium of claim 11, wherein the selected one or more latency events comprises a plurality of selected latency events, and wherein each of the plurality of bits represents one of the plurality of selected latency events.

13. The non-transitory computer readable storage medium of claim 9, wherein the selected one or more latency events comprises a plurality of selected latency events, and wherein each of a plurality of bits represents one of the plurality of selected latency events.

14. The non-transitory computer readable storage medium of claim 9, wherein the operation is a micro-operation.

* * * * *